(12) United States Patent
Buczek et al.

(10) Patent No.: US 7,544,396 B2
(45) Date of Patent: Jun. 9, 2009

(54) ELECTROSTATIC COATING COMPOSITION COMPRISING CORROSION RESISTANT METAL PARTICULATES AND METHOD FOR USING SAME

(75) Inventors: Matthew Bernard Buczek, Liberty Township, OH (US); Andrew Jay Skoog, West Chester, OH (US); Jane Ann Murphy, Franklin, OH (US)

(73) Assignee: General Electric Company, Schnectady, NY (US)

(*) Notice: Subject to any disclaimer, the term of this patent is extended or adjusted under 35 U.S.C. 154(b) by 606 days.

(21) Appl. No.: 11/075,802

(22) Filed: Mar. 10, 2005

(65) Prior Publication Data

US 2006/0204666 A1 Sep. 14, 2006

(51) Int. Cl.
*B05D 1/06* (2006.01)
(52) U.S. Cl. .................. 427/470; 427/475; 427/486
(58) Field of Classification Search .............. None
See application file for complete search history.

(56) References Cited

U.S. PATENT DOCUMENTS

| | | | |
|---|---|---|---|
| 3,248,249 A | 4/1966 | Collins, Jr. | |
| 3,248,251 A | 4/1966 | Allen | |
| 3,267,057 A | 8/1966 | Spiller | |
| 3,348,965 A | 10/1967 | Drum | |
| 3,796,590 A | 3/1974 | Spiller | |
| 4,048,136 A | 9/1977 | Kobayashi et al. | |
| 4,353,780 A | 10/1982 | Fishter et al. | |
| 4,411,730 A | 10/1983 | Fishter et al. | |
| RE31,867 E | 4/1985 | Kennon | |
| 4,544,408 A | 10/1985 | Mosser et al. | |
| 4,563,239 A | 1/1986 | Adinolfi et al. | |
| 4,576,827 A | 3/1986 | Hastings et al. | |
| 4,606,967 A | 8/1986 | Mosser | |
| 4,719,038 A | 1/1988 | Sobata et al. | |
| 4,784,331 A | 11/1988 | Sharpless et al. | |
| 4,811,898 A | 3/1989 | Murphy | |
| 4,819,879 A | 4/1989 | Sharpless et al. | |
| 4,889,558 A | 12/1989 | Mosser | |
| 4,891,394 A | 1/1990 | Savin | |
| 4,937,274 A | 6/1990 | Arima et al. | |

(Continued)

FOREIGN PATENT DOCUMENTS

GB 1 555 883 * 11/1979

OTHER PUBLICATIONS

U.S. Appl. No. 11/040,157, filed Jan. 21, 2005, Spitsberg, et al.

(Continued)

*Primary Examiner*—Frederick J Parker
(74) *Attorney, Agent, or Firm*—Marcella R. Louke; William Scott Andes

(57) ABSTRACT

A composition comprising a corrosion resistant metal particulate component comprising aluminum-containing metal particulates, wherein the aluminum-containing metal particulates have a phosphate and/or silica-containing insulating layer; and a glass-forming binder component. Also disclosed is a method comprising the following steps: (a) providing an article comprising a metal substrate; (b) imparting to the metal substrate an electrical charge; and (c) electrostatically depositing a coating composition on the electrically charged metal substrate, wherein the coating composition comprises aluminum-containing metal particulates having a phosphate and/or silica-containing insulating layer; and glass-forming binder component.

6 Claims, 5 Drawing Sheets

U.S. PATENT DOCUMENTS

| | | | |
|---|---|---|---|
| 4,975,330 A | 12/1990 | Mosser | |
| 5,156,771 A | 10/1992 | Yamamoto et al. | |
| 5,158,708 A | 10/1992 | Yamamoto et al. | |
| 5,341,989 A | 8/1994 | Fulkerson et al. | |
| 5,368,888 A | 11/1994 | Rigney et al. | |
| 5,402,940 A | 4/1995 | Haller et al. | |
| 5,582,347 A | 12/1996 | Knobbe et al. | |
| 5,622,313 A | 4/1997 | Lader et al. | |
| 5,635,548 A | 6/1997 | Kittle et al. | |
| 5,723,078 A | 3/1998 | Nagaraj et al. | |
| 5,725,161 A | 3/1998 | Hartle | |
| 5,904,294 A | 5/1999 | Knobbe et al. | |
| 5,985,454 A | 11/1999 | McMordie et al. | |
| 6,194,484 B1 | 2/2001 | Hugo | |
| 6,283,715 B1 | 9/2001 | Nagaraj et al. | |
| 6,368,394 B1 | 4/2002 | Hughes et al. | |
| 6,375,094 B1 | 4/2002 | Schroeder et al. | |
| 6,379,804 B1 * | 4/2002 | Ackerman et al. | 428/433 |
| 6,478,242 B1 | 11/2002 | Knobbe et al. | |
| 6,528,572 B1 | 3/2003 | Patel et al. | |
| 6,541,540 B2 | 4/2003 | Hashizume | |
| 6,622,937 B2 | 9/2003 | Schroeder et al. | |
| 6,758,423 B1 | 7/2004 | Perkins et al. | |
| 6,796,519 B1 | 9/2004 | Knobbe et al. | |
| 2004/0013802 A1 | 1/2004 | Ackerman et al. | |

OTHER PUBLICATIONS

U.S. Appl. No. 11/040,855, filed Jan. 21, 2005, Spitsberg, et al.
U.S. Appl. No. 10/065,558, filed Oct. 30, 2002, Spitsberg.
U.S. Appl. No. 10/798,134, filed Mar. 10, 2004, Skoog.
U.S. Appl. No. 10/892,682, filed Jul. 15, 2004, Saak, et al.
U.S. Appl. No. 11/006,368, filed Dec. 6, 2004, Hazel, et al.
U.S. Appl. No. 11/075,799, filed Mar. 10, 2005, Buczek, et al.
U.S. Appl. No. 11/084,104, filed Mar. 21, 2005, Spitsberg, et al.
U.S. Appl. No. 11/083,970, filed Mar. 21, 2005, Govern, et al.

* cited by examiner

ELECTROSTATIC COATING COMPOSITION COMPRISING CORROSION RESISTANT METAL PARTICULATES AND METHOD FOR USING SAME

BACKGROUND OF THE INVENTION

This invention broadly relates to an electrostatic coating composition comprising a corrosion resistant metal particulate component comprising aluminum-containing metal particulates having a phosphate and/or silica-containing insulating layer; and a glass-forming binder component. This invention also broadly relates to a method for using this coating composition to electrostatically coat the metal substrate of an article.

A number of corrosion resistant coatings have been suggested for protecting the metal substrate of gas turbine components, as well as other articles requiring corrosion protection. Some of these corrosion resistant coatings are applied to or deposited on the metal substrate as sacrificial coatings. These coatings are "sacrificial" in that they preferentially react with and are used up by the corrodants, thus protecting the underlying metal substrate from attack by these corrodants.

Sacrificial corrosion resistant coatings for metal substrates can be formed from chromium or more typically aluminum, or from the respective oxides (i.e., alumina or chromia), by diffusion processes or techniques such as chemical vapor deposition or pack cementation. See, for example, commonly assigned U.S. Pat. No. 5,368,888 (Rigney), issued Nov. 29, 1994 (aluminide diffusion coating); commonly assigned U.S. Pat. No. 6,283,715 (Nagaraj et al), issued Sep. 4, 2001 (chromium diffusion coating); commonly assigned U.S. Patent Application 2004/0013802 A1 (Ackerman et al), published Jan. 22, 2004 (metal-organic chemical vapor deposition of aluminum, silicon, tantalum, titanium or chromium oxide on turbine disks and seal elements to provide a protective coating). Diffusion coating processes and techniques such chemical vapor deposition can be complicated and expensive processes for applying sacrificial corrosion resistant coatings to the metal substrate. These diffusion coatings also require some of the metal in the underlying substrate to be able to diffuse therefrom to form the coating.

These sacrificial coatings can also be applied to the metal substrate as aqueous compositions comprising phosphate binder systems and aluminum/alumina particles. See, for example, U.S. Pat. No. 4,606,967 (Mosser), issued Aug. 19, 1986 (spheroidal aluminum particles); U.S. Pat. No. 4,544,408 (Mosser et al), issued Oct. 1, 1985 (dispersible hydrated alumina particles). The phosphate-containing binder systems of these aqueous coating compositions typically comprise other binder materials, including chromates. See, for example, U.S. Pat. No. 3,248,249 (Collins, Jr.), issued Apr. 26, 1966; U.S. Pat. No. 3,248,251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990.

These aqueous coating compositions comprising phosphate-containing binders are typically applied by standard "wet spray" methods commonly used for spray painting. "Wet spray" methods are relatively easy and uncomplicated methods for applying these aqueous coating compositions to the surface of the metal substrate of the article to be coated. However, due to the lack of precision of "wet spray" methods for applying coatings and to ensure adequate coverage of the surface of the metal substrate to be coated, a significant amount of the aqueous coating composition does not end up on the metal substrate, but is instead lost due to "overspraying" thereof. Because of environmental concerns that can be created by such "overspraying," aqueous coating compositions comprising phosphate-containing binders that are substantially free of chromates have been developed. See, for example, U.S. Pat. No. 6,368,394 (Hughes et al), issued Apr. 9, 2002 (substantially chromate free phosphate binder component). Even so, the lack of precision of "wet spray" application methods still makes it difficult to adequately and uniformly apply the coating composition to the surface of the metal substrate, especially a vertical extending surface, without significant and wasteful "overspraying" thereof.

Accordingly, there is still a need for sacrificial coating compositions that: (1) provide corrosion resistance for the underlying metal substrate; (2) can be applied to the metal substrate by relatively uncomplicated and inexpensive methods; (3) can be applied so as to adequately and uniformly cover the surface of the metal substrate, especially when that surface is vertical; (4) reduce or minimize wasteful "overspraying;" and (5) do not affect the intrinsic properties of the base metal or have a large interaction zone at the coating-metal interface.

BRIEF DESCRIPTION OF THE INVENTION

An embodiment of this invention broadly relates to a composition comprising:
  a corrosion resistant metal particulate component comprising aluminum-containing metal particulates, wherein the aluminum-containing metal particulates have a phosphate and/or silica-containing insulating layer; and
  a glass-forming binder component.

Another embodiment of this invention broadly relates to a method comprising the following steps:
  (a) providing an article comprising a metal substrate;
  (b) imparting to the metal substrate an electrical charge; and
  (c) electrostatically depositing a coating composition on the electrically charged metal substrate, wherein the coating composition comprises:
    a corrosion resistant metal particulate component comprising aluminum-containing metal particulates, wherein the aluminum-containing metal particulates have a phosphate and/or silica-containing insulating layer; and
    a glass-forming binder component.

The composition and method of this invention provide a number of significant benefits and advantages in providing sacrificial corrosion resistant coatings for articles comprising metal substrates. The corrosion resistant metal coating composition can be applied by an electrostatic coating method that is relatively uncomplicated and inexpensive. The embodiments of the electrostatic coating method of this invention enable the corrosion resistant coating composition to be applied adequately and uniformly on the surface of the metal substrate to provide corrosion protection. The corrosion resistant coating composition of this invention can also reduce or minimize wasteful "overspraying" of the composition. The corrosion resistant coating composition of this invention also does not adversely affect the intrinsic properties of the base metal of the substrate, or have a large interaction zone at the coating-metal interface.

DETAILED DESCRIPTION OF THE INVENTION

Figure 1:
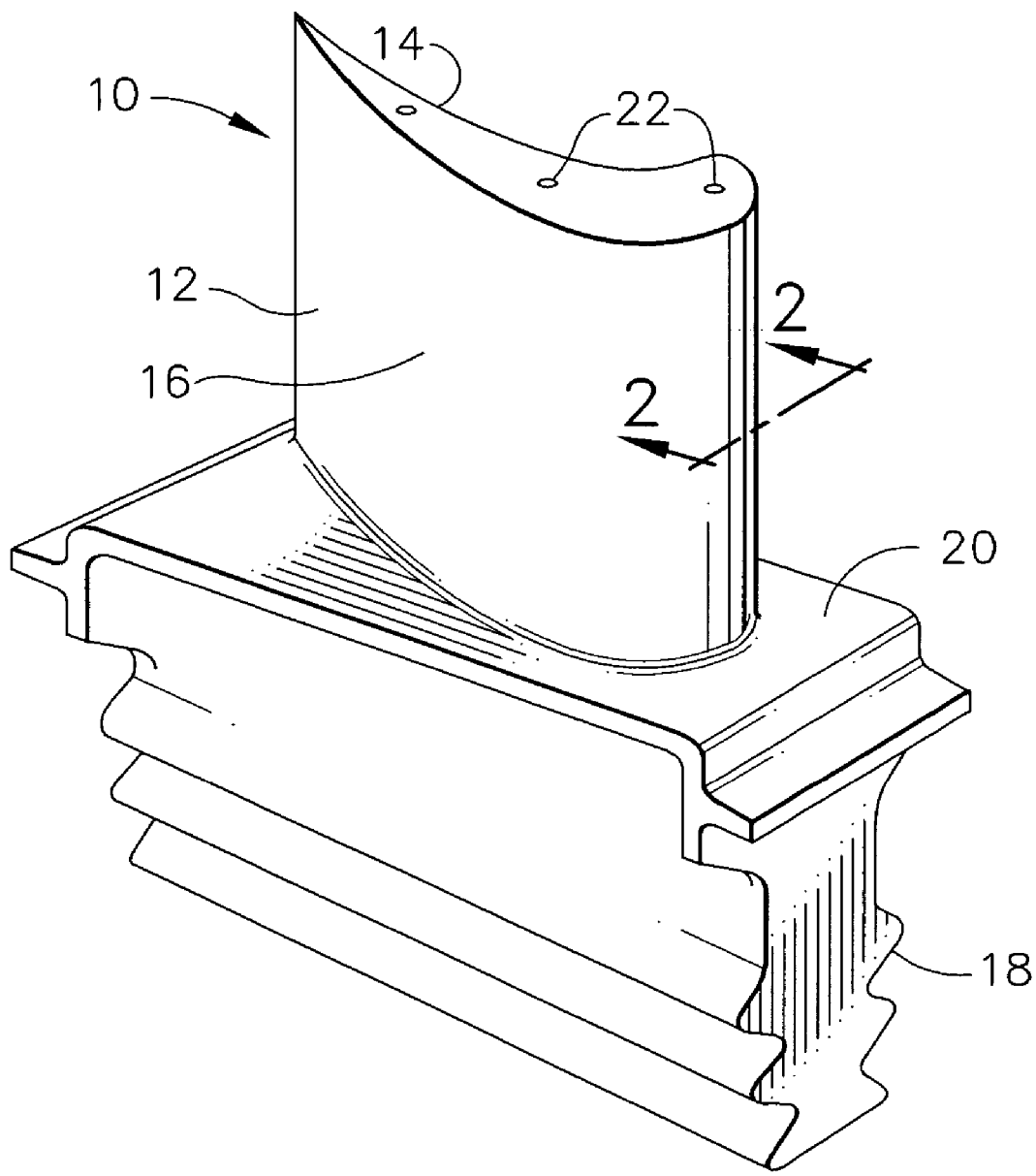
FIG. 1 is a perspective view of a turbine blade for which the coating composition of this invention is useful.

As used herein, the term "particulate" refers to a particle, powder, flake, etc., that inherently exists in a relatively small form (e.g., a size of about 150 microns or less) or can be formed by, for example, grinding, shredding, fragmenting, pulverizing or otherwise subdividing a larger form of the material into a relatively small form.

As used herein, the term "corrosion resistant metal particulate component" refers to components of this invention comprising aluminum-containing metal particulates having a phosphate and/or silica-containing insulating layer, plus other optional corrosion resistant metal particulates. These other optional corrosion resistant metal particulates can comprise chromium, zirconium, nickel, cobalt, iron, titanium, yttrium, magnesium, hafnium, silicon, tantalum, etc., or combinations thereof. The particular level and amount of aluminum-containing metal particulates and optionally other metal particulates present in the corrosion resistant particulate component can be varied depending on the CTE properties desired for the resultant corrosion resistant coating, whether the corrosion resistant coating comprises a single layer or a plurality of layers, etc. Typically, the corrosion resistant metal particulate component comprises from about 1 to about 40% aluminum-containing metal particulates, more typically from about 2 to about 20% aluminum-containing metal particulates, with the balance being other (i.e., nonaluminum) metal particulates. The particulates comprising the corrosion resistant particulate component can have particle sizes in the range of from about 0.5 to about 150 microns, more typically in the range of from about 5 to about 40 microns, and can comprise particulates having unimodal, bimodal or polymodal particle size distributions.

As used herein, the term "aluminum-containing metal particulates" refers to metal particulates comprising aluminum, or aluminum alloys, i.e., aluminum alloyed with other metals. These other metals can include chromium, nickel, cobalt, iron, hafnium, zirconium, yttrium, tantalum, platinum, palladium, rhenium, silicon, etc., or combinations thereof. Suitable aluminum alloys include those having the formula: MAl, MCrAl, and MCrAlX, wherein M is nickel, cobalt, iron or a combination thereof, and X is hafnium, zirconium, yttrium, tantalum, platinum, palladium, rhenium, silicon, or a combination thereof.

As used herein, the term "unimodal particle size distribution" refers to a particle size distribution comprising one particle size fraction. When graphically plotted, a unimodal particle size distribution has essentially a single peak.

As used herein, the term "bimodal particle size distribution" refers to a particle size distribution that comprises a smaller particle size fraction and a larger particle size fraction. When graphically plotted, a bimodal particle size distribution has essentially two distinct peaks.

As used herein, the term "polymodal particle size distribution" refers to a particle size distribution that comprises three or more particle size fractions. When graphically plotted, a polymodal particle size distribution has three or more distinct peaks.

As used herein, the term "phosphate and/or silica insulating layer" refers to an electrostatically insulating layer comprising an electrically nonconductive phosphate, an electrically nonconductive silica or an electrically nonconductive phosphate and silica combination that surrounds, encloses, encapsulates, or otherwise coats, the aluminum-containing metal particulates (as well as any other metal particulates optionally present in the corrosion resistant metal particulate component) so that the corrosion resistant metal particulate component can be applied electrostatically to the surface of the metal substrate of the article. Suitable insulating layers can be derived from triethyl phosphate, ammonium monohydrogen phosphate, phosphorous pentoxide/phosphoric anhydride (typically dissolved in a solvent such as ethanol), tetraethyl orthosilicate, etc., or combinations thereof. The insulating layer can have any suitable thickness such that the metal particulates in the coating composition can be applied or deposited by electrostatic application methods on the surface of the metal substrate of the article. Typically, the insulating layer has a thickness of from about 0.01 to about 2 microns, more typically from about 0.1 to about 1 microns. This insulating layer can be formed on the metal particulates by any suitable process, including vapor deposition, physical vapor deposition, chemical vapor deposition, atomic layer epitaxy, sol-gel processing, electroplating, electroless plating, passivation/pickling chemical treatments, aqueous or gas-phase chemical surface treatments, etc. A particularly suitable approach for forming the insulating layer on the metal particulates is by precipitation of the phosphate and/or silica (in the form of the respective silicate precursor) from solution, for example, by a sol-gel process. When formed by a sol-gel process, the phosphate and/or silica forming the insulating layer is controllably precipitated from a solution containing a precursor thereof. See commonly assigned U.S. Pat. No. 6,379,804 (Ackerman et al), issued Apr. 30, 2002 (herein incorporated by reference), which discloses a sol-gel process that can be adapted or modified to form the phosphate and/or silica insulating layer on the aluminum-containing metal particulates of this invention.

As used herein, the term "substantially free" means the indicated compound, material, component, etc., is minimally present or not present at all, e.g., at a level of about 0.5% or less, more typically at a level of about 0.1% or less, unless otherwise specified.

As used herein, the term "glass-forming binder component" refers to a component that, when cured, forms a glassy matrix to which the particulates in the particulate component are embedded in, are encapsulated in, are enclosed by, or otherwise adhered to. This binder component can comprise glass particulates (e.g., glass powder, glass frit), frits comprising other inorganic minerals, as well as phosphate binder compounds, compositions, etc., alone or in combination with other optional binder materials. These phosphate binders are typically in the form of the respective phosphate compounds/compositions, including orthophosphates, pyrophosphates, etc. These phosphate compounds/compositions can be monobasic, dibasic, tribasic or any combination thereof. The phosphate binders can comprise one or more metal phosphates, including aluminum phosphates, magnesium phosphates, chromium phosphates, zinc phosphates, iron phosphates, lithium phosphates, etc, or any combination thereof. Typically, the phosphate binder comprises an aluminum phosphate, a magnesium phosphate, a chromium phosphate or a combination thereof. Other binder materials that can be included with the phosphate binder include one or more chromates, molybdates, etc. See, for example, U.S. Pat. No. 3,248, 249 (Collins, Jr.), issued Apr. 26, 1966; U.S. Pat. No. 3,248, 251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990. The binder component can also be substantially free of binder materials other than phosphate binders, e.g., a substantially chromate free phosphate-containing binder component. See, for example, U.S. Pat. No. 6,368,394 (Hughes et al), issued Apr. 9, 2002 (substantially chromate free phosphate binder component).

As used herein, the term "corrosion resistant coating" refers to coatings of this invention that, after curing, comprise a glassy binder matrix having embedded therein, encapsulated therein, enclosed thereby, or otherwise adhered thereto, metal particulates from the corrosion resistant metal particulate component. Corrosion resistant coatings of this invention can provide resistance against corrosion caused by various corrodants, including metal (e.g., alkaline) sulfates, sulfites, chlorides, carbonates, oxides, and other corrodant salt deposits resulting from dirt, fly ash, concrete dust, sand, sea salt, etc.

As used herein, the term "corrosion resistant metal coating composition" refers to coating compositions comprising the corrosion resistant metal particulate component (typically in an amount of from about 5 to about 75%, more typically in an amount of from about 30 to about 60%, of the composition), the glass-forming binder component (typically in an amount of from about 10 to about 80%, more typically in an amount of from about 30 to about 60%, of the composition), plus any other optional components such as silicas, colorants or pigments, etc. The corrosion resistant metal coating compositions of this invention are typically formulated to have or provide a solid, flowable consistency, e.g., are formulated as solid, flowable powders, that can be deposited by electrostatic application methods or techniques.

As used herein, the term "curing" refers to any treatment condition or combination of treatment conditions that causes melting of the binder component to form a glassy matrix after the corrosion resistant metal coating composition is applied electrostatically to the metal substrate, and thereby forms the corrosion resistant coating. Typically, curing occurs by heating the applied or deposited corrosion resistant metal coating composition at a temperature of at least about 1200° F. (649° C.), more typically at least about 1550° F. (843° C.).

As used herein, the term "article" refers to any article comprising a metal substrate and requiring corrosion protection, including a wide variety of turbine engine (e.g., gas turbine engine) parts and components operated at, or exposed to, high temperatures, especially higher temperatures that occur during normal engine operation. These turbine engine parts and components can include turbine disks and turbine shafts, turbine components comprising airfoils such as turbine blades and vanes, turbine shrouds, turbine nozzles, combustor components such as liners, deflectors and their respective dome assemblies, augmentor hardware of gas turbine engines, gas turbine engine exhaust components, etc. The corrosion resistant coatings of this invention are particularly useful for articles comprising metal substrates in the form of turbine blades and vanes, and especially the airfoil portions of such blades and vanes. However, while the following discussion of articles of this invention will be with reference to turbine blades and turbine vanes, and especially the airfoil portions thereof, that comprise these blades and vanes, it should also be understood that the corrosion resistant coatings of this invention can be useful with other articles comprising metal substrates that require corrosion protection.

As used herein, the term "CTE" refers to the coefficient of thermal expansion of a material, and is referred to herein in units of $10^{-6}/°$ F. For example, alumina which has a coefficient of thermal expansion of about 4 to $5\times10^{-6}/°$ F. at about 1200° F. (649° C.) is referred to herein as having a CTE of about 4 to 5.

As used herein, the term "comprising" means various particulates, materials, coatings, compositions, components, layers, steps, etc., can be conjointly employed in the present invention. Accordingly, the term "comprising" encompasses the more restrictive terms "consisting essentially of" and "consisting of."

All amounts, parts, ratios and percentages used herein are by weight unless otherwise specified.

Compositions comprising aluminum-containing metal particulates and glass-forming binder systems, with or without additional chromate binders or other binder materials, can be used to provide corrosion resistant coatings for various articles comprising metal substrates, such as turbine blades and vanes. It would also be desirable to be able to apply these coating compositions comprising these aluminum-containing metal particulates by electrostatic application methods and techniques. Because electrostatic particles are attracted to the electrically charged metal substrate, electrostatic methods and techniques provide a more precise (targeted) application of the coating composition to adequately and uniformly cover the surface thereof so as to reduce the amount of "overspray." Also, in the case of flowable solid (e.g., flowable powder) coating compositions, any powder or solid "oversprayed" during electrostatic application can be relatively easily recovered and reused. Because of the electrostatic attraction of the coating particulates to the electrically charged metal substrate, electrostatic application methods can also permit the application of the coating composition around corners of the metal substrate (commonly referred to as "powder wrap").

However, it has been discovered that prior corrosion resistant coatings comprising aluminum-containing metal particulates cannot be applied (e.g., sprayed) electrostatically so as to adhere to a metal substrate that has been electrically charged. Because prior aluminum-containing metal particulates are electrically conductive, it has been found that these aluminum-containing metal particulates, when applied under electrostatic conditions, do not retain their electrostatic charge for an adequate period of time. As a result, the aluminum-containing metal particulates do not adhere to the electrically charged metal substrate until the coating composition can be cured. Instead, after the coating composition is sprayed, especially on a substantially vertical surface of an electrically charged metal substrate, the sprayed aluminum-containing metal particulates tend to fall off.

The corrosion resistant metal coating compositions of this invention solve this problem by providing the aluminum-containing metal particulates with a phosphate and/or silica-containing insulating layer. This insulating layer permits the normally electrically conductive aluminum-containing metal particulates in the coating composition to be applied by conventional electrostatic application methods and techniques. In particular, when the coating composition is applied, e.g., sprayed, under electrostatic conditions, the aluminum-containing metal particulates having the phosphate and/or silica-containing insulating layer adhere to the surface of the electrically charged metal substrate, even when that surface is vertically extending, for an adequate period of time for the applied coating to be cured. Indeed, the coating composition comprising these insulated aluminum-containing metal particulates can be applied so as to flow around corners of the electrically charged metal substrate (i.e., "powder wrap"), and thus adhere to the corner surfaces, as well as portions of the surfaces extending beyond the corners of the metal substrate.

The various embodiments of this invention are further illustrated by reference to the drawings as described hereafter. Referring to the drawings, FIG. 1 depicts a component article of a gas turbine engine such as a turbine blade or turbine vane, and in particular a turbine blade identified generally as 10. (Turbine vanes have a similar appearance with respect to the pertinent portions.) Blade 10 generally includes an airfoil 12 against which hot combustion gases are directed during operation of the gas turbine engine, and whose surfaces are therefore at risk to attack by environmental corrodants such as sea salt. Airfoil 12 has a "high-pressure side" indicated as 14 that is concavely shaped; and a suction side indicated as 16 that is convexly shaped and is sometimes known as the "low-pressure side" or "back side." In operation the hot combustion gas is directed against the high-pressure side 14. Blade 10 is anchored to a turbine disk (not shown) with a dovetail 18 formed on the root section 20 of blade 10. In some embodiments of blade 10, a number of internal passages extend through the interior of airfoil 12, ending in openings indicated as 22 in the surface of airfoil 12. During operation, a flow of cooling air is directed through the internal passages (not shown) to cool or reduce the temperature of airfoil 12

Figure 2:
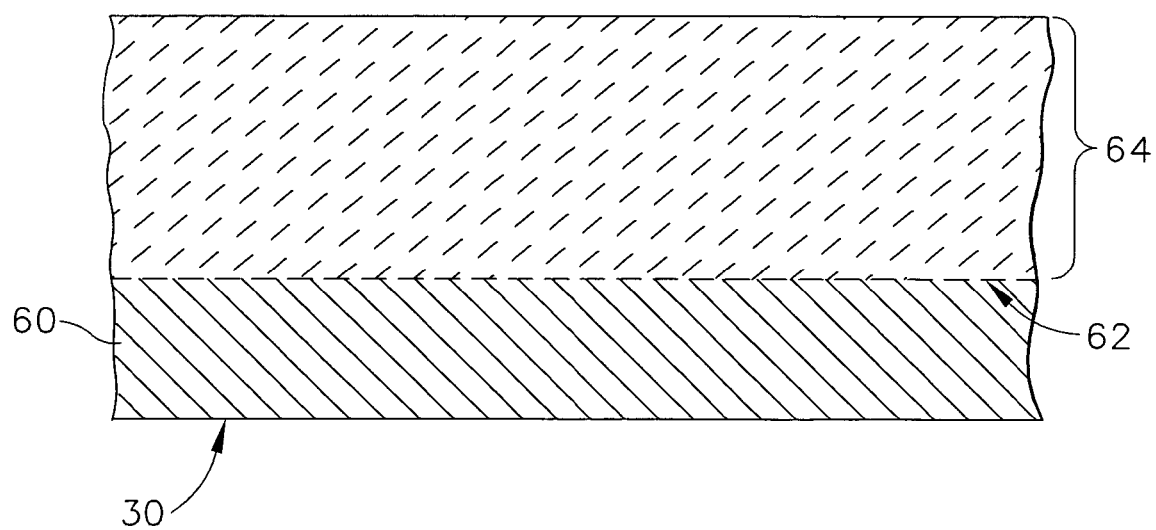
FIG. 2 is a sectional view of the blade of FIG. 1 with a corrosion resistant coating formed on the blade substrate using an embodiment of the coating composition of this invention.

Referring to FIG. 2, the base material of airfoil 12 of blade 10 that serves as the metal substrate 60 having the corrosion resistant coating of this invention can comprise any of a variety of metals, or more typically metal alloys, including those based on nickel, cobalt and/or iron alloys. Substrate 60 typically comprises a superalloy based on nickel, cobalt and/or iron. Superalloys are generally described in Kirk-Othmer's Encyclopedia of Chemical Technology, 3rd Ed., Vol. 12, pp. 417-479 (1980), and Vol. 15, pp. 787-800 (1981). Illustrative nickel-based superalloys are designated by the trade names Inconel®, Nimonic®, Rene® (e.g., Rene® 88, Rene® 104 alloys), and Udimet®.

Substrate 60 more typically comprises a nickel-based alloy, and particularly a nickel-based superalloy, that has more nickel than any other element. The nickel-based superalloy can be strengthened by the precipitation of gamma prime or a related phase. A nickel-based superalloy for which the ceramic corrosion resistant coating of this invention is particularly useful is available by the trade name René 88, which has a nominal composition, by weight of 13% cobalt, 16% chromium, 4% molybdenum, 3.7% titanium, 2.1% aluminum, 4% tungsten, 0.70% niobium, 0.015% boron, 0.03% zirconium, and 0.03 percent carbon, with the balance nickel and minor impurities.

Prior to forming the corrosion resistant coating 64 of this invention on the surface 62 of metal substrate 60, surface 62 is typically pretreated mechanically, chemically or both to make the surface more receptive for coating 64. Suitable pretreatment methods include grit blasting, with or without masking of surfaces that are not to be subjected to grit blasting (see U.S. Pat. No. 5,723,078 to Niagara et al, issued Mar. 3, 1998, especially col. 4, lines 46-66, which is incorporated by reference), micromachining, laser etching (see U.S. Pat. No. 5,723,078 to Nagaraj et al, issued Mar. 3, 1998, especially col. 4, line 67 to col. 5, line 3 and 14-17, which is incorporated by reference), treatment (such as by photolithography) with chemical etchants such as those containing hydrochloric acid, hydrofluoric acid, nitric acid, ammonium bifluorides and mixtures thereof, (see, for example, U.S. Pat. No. 5,723,078 to Nagaraj et al, issued Mar. 3, 1998, especially col. 5, lines 3-10; U.S. Pat. No. 4,563,239 to Adinolfi et al, issued Jan. 7, 1986, especially col. 2, line 67 to col. 3, line 7; U.S. Pat. No. 4,353,780 to Fishter et al, issued Oct. 12, 1982, especially col. 1, lines 50-58; and U.S. Pat. No. 4,411,730 to Fishter et al, issued Oct. 25, 1983, especially col. 2, lines 40-51, all of which are incorporated by reference), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size of from about 600 to about 35 mesh (from about 20 to about 500 micrometers), more typically from about 400 to about 270 mesh (from about 38 to about 53 micrometers).

The corrosion resistant coating 64 can be formed on metal substrate 60 by a method comprising the following steps: (a) imparting to the metal substrate an electrical charge; (b) electrostatically depositing the coating composition on the electrically charged metal substrate; and (c) curing the deposited coating composition while electrostatically charged at a curing temperature that causes the corrosion resistant particulate component (i.e., aluminum metal particulates, plus any other metal particulates) and glass-forming binder component to form a corrosion resistant coating 64 that comprises a glassy matrix of binder to which the particulates in the particulate component are embedded in, encapsulated in, enclosed by, or otherwise adhered to. The coating composition can be deposited on substrate 60 by any manner of electrostatic application, e.g., spraying, to provide an uncured layer of the composition comprising the particulates and binder. For example, the coating composition can be deposited on substrate 60 using a conventional electrostatic powder sprayer or gun system such as a Nordson Sure Coat electrostatic powder spray system. See also, for example, U.S. Pat. No. 6,796,519 (Knobbe et al), issued Sep. 28, 2004; U.S. Pat. No. 6,758,423 (Perkins et al), issued Jul. 6, 2004; U.S. Pat. No. 6,478,242 (Knobbe et al), issued Nov. 12, 2002; U.S. Pat. No. 5,904,294 (Knobbe et al), issued May 18, 1999; U.S. Pat. No. 5,622,313 (Lader et al), issued Apr. 22, 1997; U.S. Pat. No. 5,582,347 (Knobbe et al), issued Dec. 10, 1996; U.S. Pat. No. 5,402,940 (Haller et al), issued Apr. 4, 1995; U.S. Pat. No. 4,819,879 (Sharpless et al), issued Apr. 11, 1989; U.S. Pat. No. 4,811,898 (Murphy), issued Mar. 14, 1989; U.S. Pat. No. 4,784,331 (Sharpless et al), issued Nov. 15, 1988; U.S. Pat. No. 4,576,827 (Hastings et al), issued Mar. 18, 1986; and U.S. Pat. No. 5,582,347 (Knobbe et al), issued Dec. 10, 1996, which disclose some illustrative electrostatic powder sprayers/guns using tribo-electric and/or corona electrostatic charging systems that are suitable for use herein.

Figure 3:
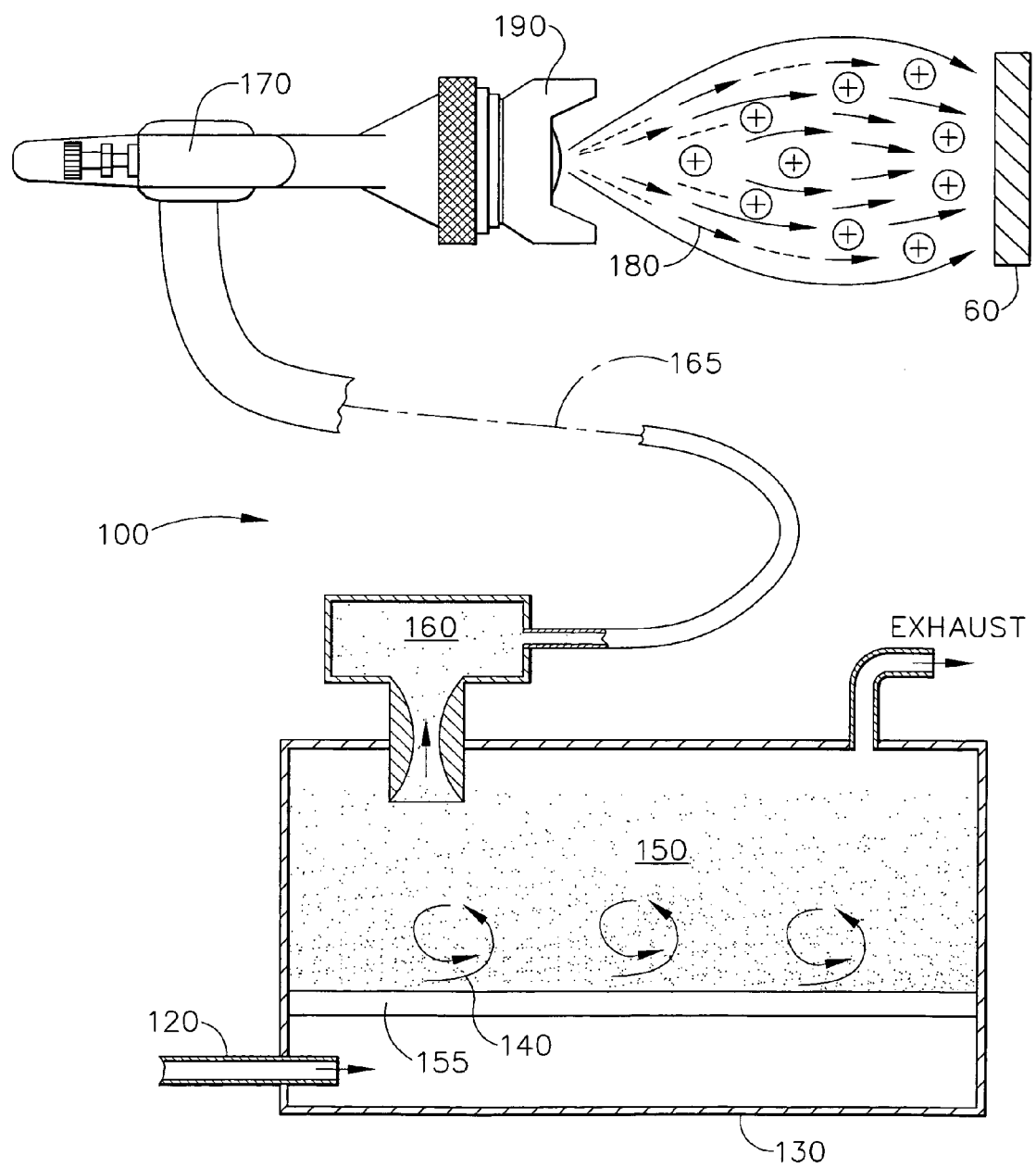
FIG. 3 is schematic illustration of an embodiment of the method of this invention using a tribo electrostatic spray system.

FIG. 3 schematically illustrates a tribo-electric electrostatic charging system indicated generally as 100 suitable for electrostatically applying the corrosion resistant metal coating composition of this invention. As shown in FIG. 3, system 100 comprises an air supply 120 that enters fluidizing chamber 130. Chamber 130 includes fluidizing air indicated as 140, with the fluidized powder coating composition of this invention being indicated as 150. A porous medium indicated as 155 can be placed between the incoming fluidized air 140 and fluidized powder 150. Fluidized powder 150 enters an atomizer indicated as 160 and exits as a mixture of powder and air indicated generally as 165. This mixture of powder and air 165 enters a tribo-charging tube or spray gun 170. Electrostatically charged particles indicated as 180 exit the spray head 190 and are attracted to the metal substrate 60, which is grounded.

Figure 4:
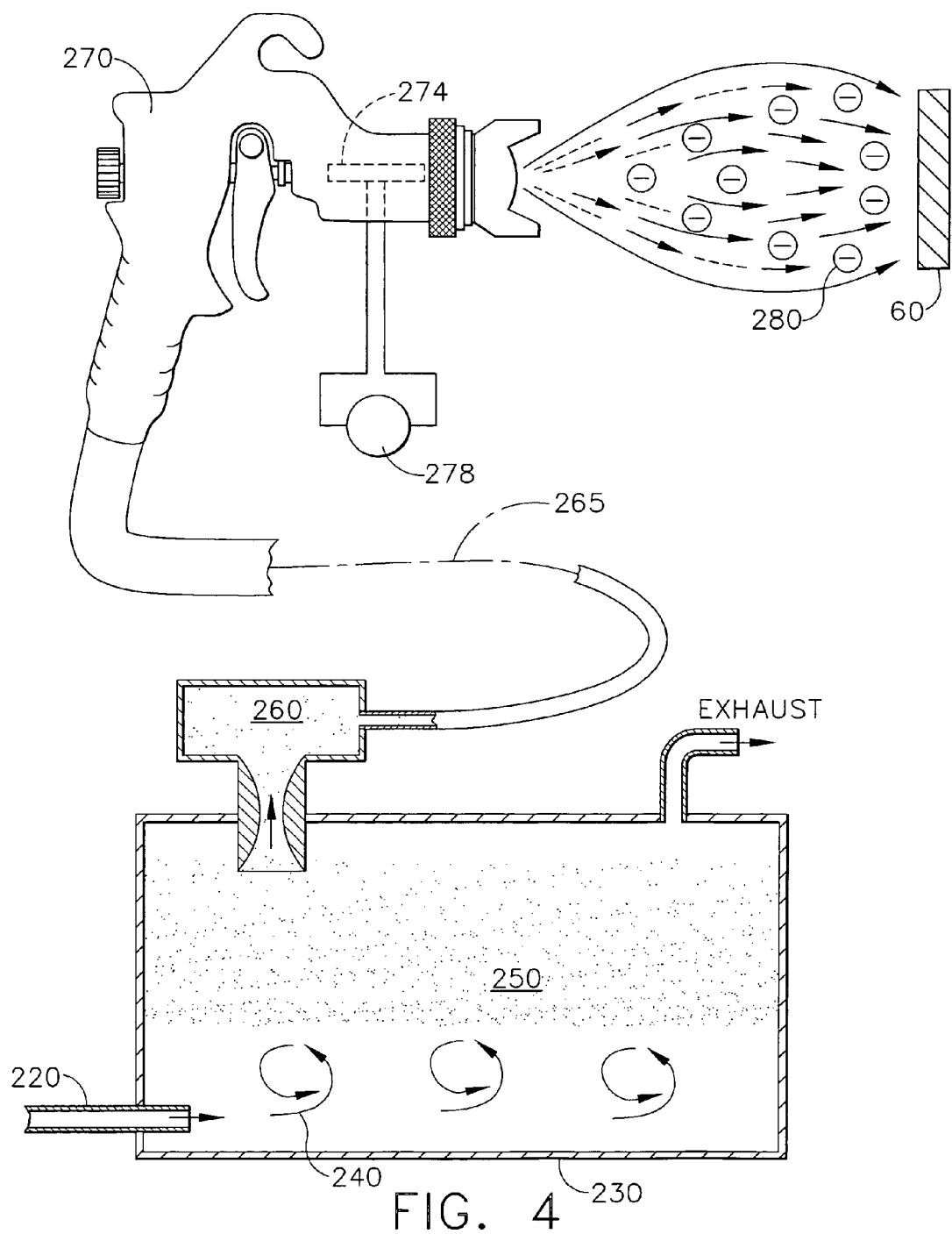
FIG. 4 is schematic illustration of an embodiment of the method of this invention using a corona electrostatic spray.

FIG. 4 schematically illustrates a corona type electrostatic system indicated generally as 200 that is also suitable for electrostatically applying the corrosion resistant metal coating composition of this invention. As shown in FIG. 4, system 200 comprises an air supply 220 that enters fluidizing chamber 230. Chamber 230 includes fluidizing air indicated as 240, with the fluidized powder coating composition of this invention being indicated as 250. Fluidized powder 250 enters an atomizer indicated as 260 and exits as a mixture of powder and air indicated as 265. This mixture of powder and air 265 enters a corona spray gun indicated as 270. Enclosed in spray gun 270 is an electrode 274 in contact with high voltage indicated as 278. Electrostatically charged particles indicated as 280 exit spray gun 270 and are attracted to the metal substrate 60, which is also grounded.

This deposited composition layer is then cured, typically be heating at a temperature of at least about 1200° F. (649° C.), more typically at least about 1550° F. (843° C.), to form corrosion resistant coating 64. Coating 64 can be formed up to a thickness of at least about 10 mils (254 microns), and typically has a thickness in the range of from about 0.5 to about 5 mils (from about 13 to about 127 microns), more typically from about 1 to about 2.5 mils (from about 25 to about 64 microns).

Coating 64 can be formed as a single layer, or can be formed as a plurality of layers. In forming a plurality of layers in coating 64, each respective layer can be formed by depositing the coating composition and then curing the deposited composition, with the layers being built by depositing the coating composition on the underlying layer that was previously formed. The respective layers can have the same or differing thicknesses. The coating composition used in forming each of the respective layers can having the same or differing levels of particulate component and binder component. In addition, the level of aluminum-containing metal particulates in the particulate component of the corrosion resistant coating composition can be the same or different in the respective deposited layers of coating 64. Each layer deposited can be cured to the same or different degrees. If desired, an outer glassy layer can be formed on coating 64 that comprises depositing and curing a coating composition consisting essentially of the glass-forming binder component that is substantially free of the particulate component.

Figure 5:
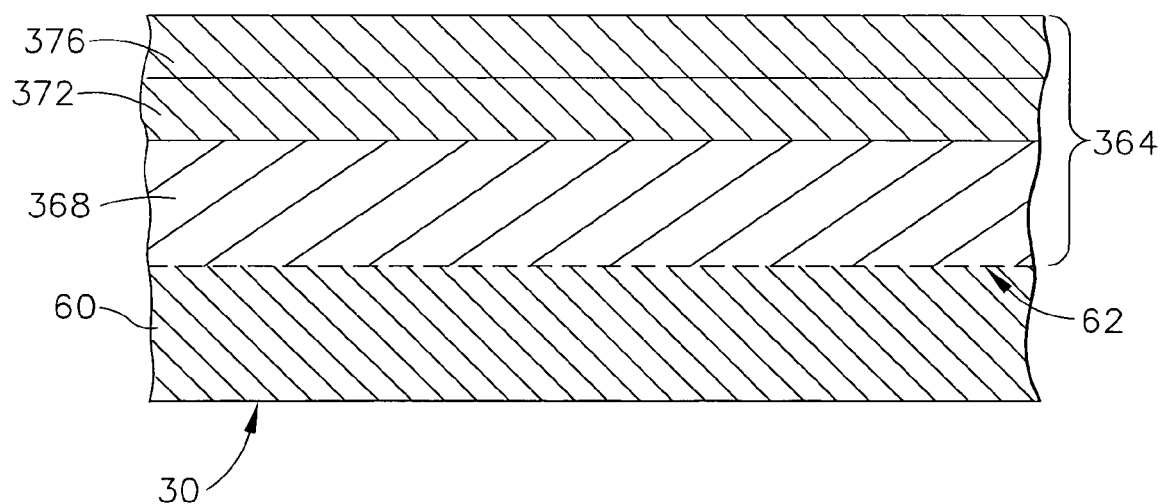
FIG. 5 is a sectional view similar to FIG. 2 of a corrosion resistant coating comprising a plurality of layers formed by an embodiment of the method of this invention.

An embodiment of a corrosion resistant coating of this invention comprising a plurality of layers is shown in FIG. 5 and is indicated generally as 364. As shown in FIG. 5, coating 364 comprises an inner layer 368 that is adjacent to and overlaying metal substrate 60. Inner layer 368 is relatively thick and typically has a thickness of from about 0.5 to about 5 mils (from about 13 to about 127 microns), more typically from about 1 to about 2.5 mils (from about 25 to about 64 microns). Typically, the inner layer 368 comprises from about 5 to about 75% metal particulates, more typically from about 30 to about 60% metal particulates.

Coating 364 also comprises an intermediate layer indicated generally as 372 adjacent to and overlaying inner layer 368. Intermediate layer 372 is typically thinner, especially relative to inner layer 368. Intermediate layer 372 typically has a thickness of from about 0.1 to about 2.5 mils (from about 3 to about 64 microns), more typically from about 0.5 to about 1.5 mils (from about 13 to about 38 microns). Intermediate layer 372 can also comprise an increased or decreased amount or level of metal particulates than that present in inner layer 368. Typically, intermediate layer 372 can comprise from about 10 to about 70% metal particulates, more typically from about 20 to about 50% metal particulates.

As shown in FIG. 5, coating 364 can further comprise an outer layer indicated generally as 376 adjacent to and overlaying intermediate layer. (In the absence of layer 376, layer 372 would become the outer layer of coating 364.) This outer layer 376 can comprise a metal particulate component, but is typically substantially free of metal particulates. Typically, outer layer 376 consists essentially of the glass-forming binder component to form relatively hard, glassy layer. Outer layer 376 is also typically the thinnest layer of coating 364, especially when substantially free of metal particulates. Typically, outer layer 376 has a thickness of from about 0.5 to about 5 mils (from about 13 to about 127 microns), more typically from about 1 to about 3 mils (from about 25 to about 76 microns).

While the above embodiments have been described in the context of coating turbine blades and vanes, this invention can be used to form corrosion resistant coatings, as described above, on the surfaces of other turbine components or other articles. The corrosion resistant coatings of this invention can also be formed during original manufacture of the component (i.e., an OEM component), after the component has been in operation for a period of time, after other coatings have been removed from the component (e.g., a repair situation), while the component is assembled or after the component is disassembled, etc.

While specific embodiments of this invention have been described, it will be apparent to those skilled in the art that various modifications thereto can be made without departing from the spirit and scope of this invention as defined in the appended claims.

What is claimed is:

1. A method comprising:
    a) electrostatically spraying a first fluidized powder coating composition onto an electrically charged metal substrate to provide at least a first coating layer on the metal substrate, wherein the first coating composition comprises a first level of a particulate component and a first level of a binder component, wherein:
        the first particulate component comprises electrostatically insulated aluminum-containing metal particulates being coated with a phosphate and/or silica-containing insulating layer; and
        the first binder component comprises a glass forming binder;
    b) thereafter, curing the first coating layer to form a corrosion resistant coating on the metal substrate; and
    c) subsequent to (b), depositing and curing a coating composition consisting essentially of the glass-forming binder onto the metal substrate to form an outer glassy layer.

2. The method of claim 1 wherein the metal substrate comprises a gas turbine engine component.

3. The method of claim 2 wherein the gas turbine engine component is at least one component selected from a turbine disk, a turbine shaft, a turbine blade, and a turbine vane.

4. The method of claim 1 wherein in (b), the curing step is carried out by heating the deposited coating composition at a temperature of at least about 1200° F.

5. The method of claim 1 wherein the metal substrate has a substantially vertical surface and wherein step (a) is carried out by electrostatically spraying the coating composition on the substantially vertical surface.

6. The method according to claim 1 further comprising:
    prior to (c), electrostatically spraying a second fluidized powder coating composition onto the electrically charged metal substrate to provide at least a second coating layer on the metal substrate, wherein the second coating composition comprises a second level of the particulate component and a second level of the binder component, and
    thereafter, curing the second coating layer.

* * * * *